United States Patent
Okumura

(10) Patent No.: US 8,107,731 B2
(45) Date of Patent: Jan. 31, 2012

(54) TEXT CONVERSION APPARATUS CAPABLE OF RELIEVING INPUTTING LOAD AND A METHOD THEREFOR

(75) Inventor: Koji Okumura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 905 days.

(21) Appl. No.: 12/155,731

(22) Filed: Jun. 9, 2008

(65) Prior Publication Data

US 2008/0310724 A1 Dec. 18, 2008

(30) Foreign Application Priority Data

Jun. 14, 2007 (JP) ................. 2007-157428

(51) Int. Cl.
*G06K 9/18* (2006.01)

(52) U.S. Cl. ........................................ 382/185

(58) Field of Classification Search .......... 382/185; 341/22, 23; 707/760
See application file for complete search history.

(56) References Cited

U.S. PATENT DOCUMENTS

| | | | | |
|---|---|---|---|---|
| 5,802,381 | A * | 9/1998 | Matsumoto et al. ........ | 715/202 |
| 6,636,162 | B1 * | 10/2003 | Kushler et al. .............. | 341/28 |
| 7,165,021 | B2 * | 1/2007 | Sugano ....................... | 704/8 |
| 2003/0061031 | A1 * | 3/2003 | Kida et al. .................. | 704/10 |
| 2003/0233615 | A1 | 12/2003 | Morimoto et al. | |

FOREIGN PATENT DOCUMENTS

| | | |
|---|---|---|
| JP | 63000768 | 1/1988 |
| JP | 9114817 | 5/1997 |
| JP | 2004145418 | 5/2004 |

\* cited by examiner

*Primary Examiner* — John Strege
(74) *Attorney, Agent, or Firm* — Rabin & Berdo, P.C.

(57) ABSTRACT

A text input device receives, in its information input circuit, a letter indicating a destination of transmission as information on the destination of transmission. The text input device stores, in its word-finder with learning function, an input text and an output text in a state correlated with the information on the destination of transmission or its attribute. The text input device in its text learning circuit controls a change in storage caused by correlating an input text matched to a text entered with the information on the destination of transmission or its attribute stored and coincident with the information on the destination of transmission or its attribute entered. When a text matched to the text entered is output, the text input device in its text converter takes out and outputs at least one output text stored.

8 Claims, 11 Drawing Sheets

| DESTINATION OF TRANSMISSION (44) | INPUT TEXT (38) | OUTPUT TEXT (40) | FREQUENCY (50) |
|---|---|---|---|
| U1 | こうえん — 65 | 公園 — 55 | 15 |
| U1 | こうきゅう — 51 | 硬球 — 61 | 10 |
| U1 | こうきゅう | 高級 — 67 | 3 |
| U2 | こうえん — 65 | 講演 — 57 | 8 |
| U2 | こうきゅう — 51 | 公休 — 63 | 4 |
| U2 | こうきゅう | 高級 — 67 | 2 |
| U3 | こうえん | 59 — こうえん(park) | 1 |
| U3 | こうきゅう | こうきゅう(hardball) | 1 |

67

PRIOR ART

FIG. 4

| DESTINATION OF TRANSMISSION (44) | INPUT TEXT (38) | OUTPUT TEXT (40) |
|---|---|---|
| U1 | こうえん —65 | 公園 —55 |
| U1 | こうきゅう —51 | 硬球 —61 |
| U2 | こうえん | 講演 —57 |
| U2 | こうきゅう | 公休 —63 |
| U3 | こうえん | こうえん(park) —59 |
| U3 | こうきゅう | こうきゅう(hardball) —67 |

FIG. 5

| INPUT TEXT | OUTPUT TEXT | FREQUENCY |
|---|---|---|
| こうえん | 公園 〜 55 | 15 |
| こうきゅう | 硬球 〜 61 | 10 |
| こうえん | 講演 〜 57 | 8 |
| こうきゅう | 高級 〜 67 | 5 |
| こうきゅう | 公休 〜 63 | 4 |
| こうえん | 59 〜 こうえん(park) | 1 |
| こうきゅう | こうきゅう(hardball) | 1 |

38 — INPUT TEXT
40 — OUTPUT TEXT
50 — FREQUENCY
65, 51, 69

PRIOR ART

FIG. 6

| DESTINATION OF TRANSMISSION (44) | INPUT TEXT (38) | OUTPUT TEXT (40) | FREQUENCY (50) |
|---|---|---|---|
| U1 | こうえん 〜 65 | 公園 〜 55 | 15 |
| U1 | こうきゅう 〜 51 | 硬球 〜 61 | 10 |
| U1 | こうきゅう | 高級 〜 67 | 3 |
| U2 | こうえん 〜 65 | 講演 〜 57 | 8 |
| U2 | こうきゅう 〜 51 | 公休 〜 63 | 4 |
| U2 | こうきゅう | 高級 〜 67 | 2 |
| U3 | こうえん | 59 〜 こうえん(park) | 1 |
| U3 | こうきゅう | こうきゅう(hardball) 〜 67 | 1 |

PRIOR ART

TEXT CONVERSION APPARATUS CAPABLE OF RELIEVING INPUTTING LOAD AND A METHOD THEREFOR

BACKGROUND OF THE INVENTION

1. Field of the Invention

The present invention relates to a text conversion apparatus capable of relieving inputting load, and more particularly to apparatus for text conversion which is adapted to enter an input text such as letters, e.g. Japanese letters (kana), to be converted to an output text, such as a character or characters (string of characters), e.g. kanji or Chinese characters, to be transmitted and accurately list a candidate or candidates for conversion to be selected to thereby be converted to the character or characters. The present invention also relates such a method therefor.

2. Description of the Background Art

There have so far been proposed apparatus for moderating the load of the operation in inputting a string of letters to be converted. In apparatus such as personal computers, word processors, mobile phones or PDAs (Personal Digital Assistants), such an inputting method is used in which keys, e.g. alphanumeric keys, allocated to letters are manipulated to input letters to be converted in order to get a desired string of characters. For example, when such letter keys are depressed to input letters required for being converted to a character and a conversion key is then depressed, at least one character or a character string corresponding to the input letters is taken out from a word-finder, i.e. a dictionary, and displayed on a monitor unit of the apparatus. With those apparatus, when desired one of the characters or character strings is selected and an entry key is depressed, the intended character or character string may promptly be input with such a small volume of key operations. In particular, a small-sized information processing terminal device, having its input/output interface made smaller in size, tends to be lowered in its operational performance in proportion to the configuration for inputting and displaying character strings. Thus, in the small-sized information processing terminal device, there may be cases where it is a crucial designing requirement to decrease the load in the inputting operation.

Japanese patent laid-open publication No. 768/1988 teaches an apparatus for formulating Japanese sentences. This apparatus for formulating Japanese sentences interprets an input clause and uses a knowledge database to predict a clause following thereto to present a so predicted clause.

Japanese patent laid-open publication No. 114817/1997 teaches a text input apparatus, which predicts, when a character string is input, a conversion candidate that may follow the input character string to present the predicted string. This text input apparatus presents, among the conversion candidates, a predetermined number of candidates selected in the latest order of the preparation time, such as to relieve the load of the inputting operation.

U. S. patent application publication No. US 2003/0233615 A1 to Morimoto et al., discloses an information processing apparatus, in which, when a subject for conversion, such as letters, is processed with one or more conversion candidates, the subject for conversion is correlated with time information to thereby raise the efficiency for processing for conversion. In this information processing apparatus, when a Japanese letter, such as a kana letter, corresponding to "o" is input and the conversion key is depressed, a string of letters "ohayo" or "oyasumi" is associatively and preferentially displayed on the monitor in dependent on whether the current time is morning or night, respectively.

In Japanese patent laid-open publication No. 2004-145418, there is disclosed an email formulating apparatus, in which the user inputs relevant information such as a destination or addressee in a database in advance and the specifications for a message input display screen are adapted depending on the input address to thereby prevent transmission of an email of inappropriate content or an email to a wrong address. With this email formulating apparatus, the kana-kanji conversion level or a mode of checking the wording, as applied to inputting a message, is appropriately adapted using such relevant information.

It should be noted that, when a character string to be transmitted to a destination of transmission, such as of an email, chat, messenger or electronic bulletin board, is entered, the above apparatus may sometimes use particular character strings or wording styles, depending on social relationships, such as business or intercourse relationships, with the destination of transmission. In such a case, when a letter string containing at least one letter is entered as a subject for conversion, if the above apparatus properly presents a string of characters, which may prove a conversion candidate, in dependence upon a particular destination of transmission, the apparatus then can select an intended character string with ease. This may lessen the load involved in the inputting operation.

However, the apparatus disclosed by the Japanese '768 or '817 publication indicated above is merely adapted to use an input letter string to extract conversion candidates. These apparatus fail to take into account the relationship with the destinations of transmission. Hence, these apparatus are unable to optimize the processing for conversion depending on the destination of transmission.

In the information processing apparatus, disclosed, by Morimoto et al., the processing for conversion may be improved in efficiency only for letter strings pertinent to time information, such as sentences for salutation. This apparatus is unable to optimize the processing for conversion depending on the destination of transmission and to moderate the load on the inputting operation.

In the email formulating apparatus, described in Japanese '418 publication, it is possible to adapt, depending on a destination of transmission, the condition for conversion pertinent to the wording check mode or to the level of kana-kanji conversion in inputting a letter string as a subject of transmission to prevent transmission of the character string of inappropriate content.

However, this email formulating apparatus after all selects one of predetermined conditions for conversion depending on a destination of transmission. It is thus not possible with the email formulating apparatus to present a character string that may prove to be a candidate for conversion appropriately for a particular destination of transmission. If the apparatus is used for selecting a condition for conversion, relevant information concerning a destination of transmission needs to be pre-input or set. It is thus not easy for the email formulating apparatus of the Japanese '418 publication to optimize the processing for conversion depending on a destination of transmission.

With the above prior-art apparatus, disclosed by the Japanese '768, '817 and '418 publications and Morimoto et al., it may be possible to optimize the processing for conversion. It may sometimes occur, however, that abusive use of the learning or prediction function of the text input device may lead to conjecturing how the information thus inputted is. If an arbitrary letter string is input as a subject for conversion to these apparatus to convert the input letter string, then character strings, which may prove to be candidates for conversion pertinent to the subject for conversion, are taken out from the learning functional memory, that is, a word-finder or a dictionary, to be displayed on the monitor screen.

In particular, since the learning memory has stored therein the information including the past conversion history, the information input in the past may be guessed from the character strings presented for the subject of conversion as being the possible candidates for conversion.

SUMMARY OF THE INVENTION

It is an object of the present invention to provide a text conversion apparatus with which character strings that may prove to be candidates for conversion may be presented using information other than temporal information, and also to provide a corresponding text conversion method.

In accordance with the present invention, there is provided a text conversion apparatus wherein a text is entered which includes at least one letter associated with a character to be transmitted, and one candidate matching the text entered is selected among a plurality of candidates of output texts to which the text entered is to be at least partially converted, the one candidate being output from an output circuit as an output text including the character to be transmitted. The text conversion apparatus includes an information input circuit for entering a letter indicating a destination of transmission as information on the destination of transmission, and a text converter for converting the text entered to an output text matched to the text entered. The text conversion apparatus also includes a word-finder with learning function for storing an input text and the output text in association with the information on the destination of transmission or an attribute thereof. The text conversion apparatus also includes a text learning circuit for controlling a change in storage caused by correlating the input text relevant to the text entered with the information on the destination of transmission or the attribute thereof stored and coincident with the input information on the destination of transmission or the attribute thereof entered to thereby generate a candidate of conversion of the text entered. The text converter takes out an output text which is matched to the input text stored in correlation with the information on the destination of transmission or the attribute thereof stored and coincident with the input information on the destination of transmission or the attribute thereof entered.

In accordance with the present invention, there is also provided a method for text conversion wherein a text is entered which includes at least one letter associated with a character to be transmitted, and one candidate matching the text entered is selected among a plurality of candidates of output texts to which the text entered is to be at least partially converted, the one candidate being output as an output text including the character to be transmitted. The method comprises a first step of inputting a letter indicating a destination of transmission as information on the destination of transmission, a second step of storing an input text and the output text in association with the information on the destination of transmission or an attribute thereof, a third step of taking out, as a candidate for conversion of text entered, at least one output text stored correlated with the input text relevant to the text entered and with the information on the destination of transmission or the attribute thereof stored and coincident with the information on the destination of transmission or the attribute thereof entered, and a fourth step of outputting at least one output text taken out in outputting a converted text matched to the text entered.

In accordance with the present invention, there is also provided a program for having a computer operate as the text conversion apparatus set forth above.

According to the present invention, the information input circuit receives a letter, representing a destination of transmission, as information on the destination of transmission. The word-finder with learning function stores an input text and an output text in the state of being correlated with the information on the destination of transmission or the attribute thereof. The text learning circuit controls a change in storage caused by correlating an input text relevant with the text entered, with the information on the destination of transmission or the attribute thereof stored and coincident with the information on the destination of transmission or the attribute thereof entered, by way of finding a candidate for conversion of the text entered. In outputting a converted text, or character string, matched to the text entered, a text converter takes out and outputs at least one output text stored therein.

BRIEF DESCRIPTION OF THE DRAWINGS

The objects and features of the present invention will become more apparent from consideration of the following detailed description taken in conjunction with the accompanying drawings in which:

FIG. 4 shows an example of data constitution of a word-finder having the learning function in the text input device shown in FIG. 1;

FIG. 5 shows an example of data constitution of a history memory in the conventional text input device;

FIG. 6 shows an example of data constitution of a history memory in the text input device shown in FIG. 1;

DESCRIPTION OF THE PREFERRED EMBODIMENT

Figure 1:
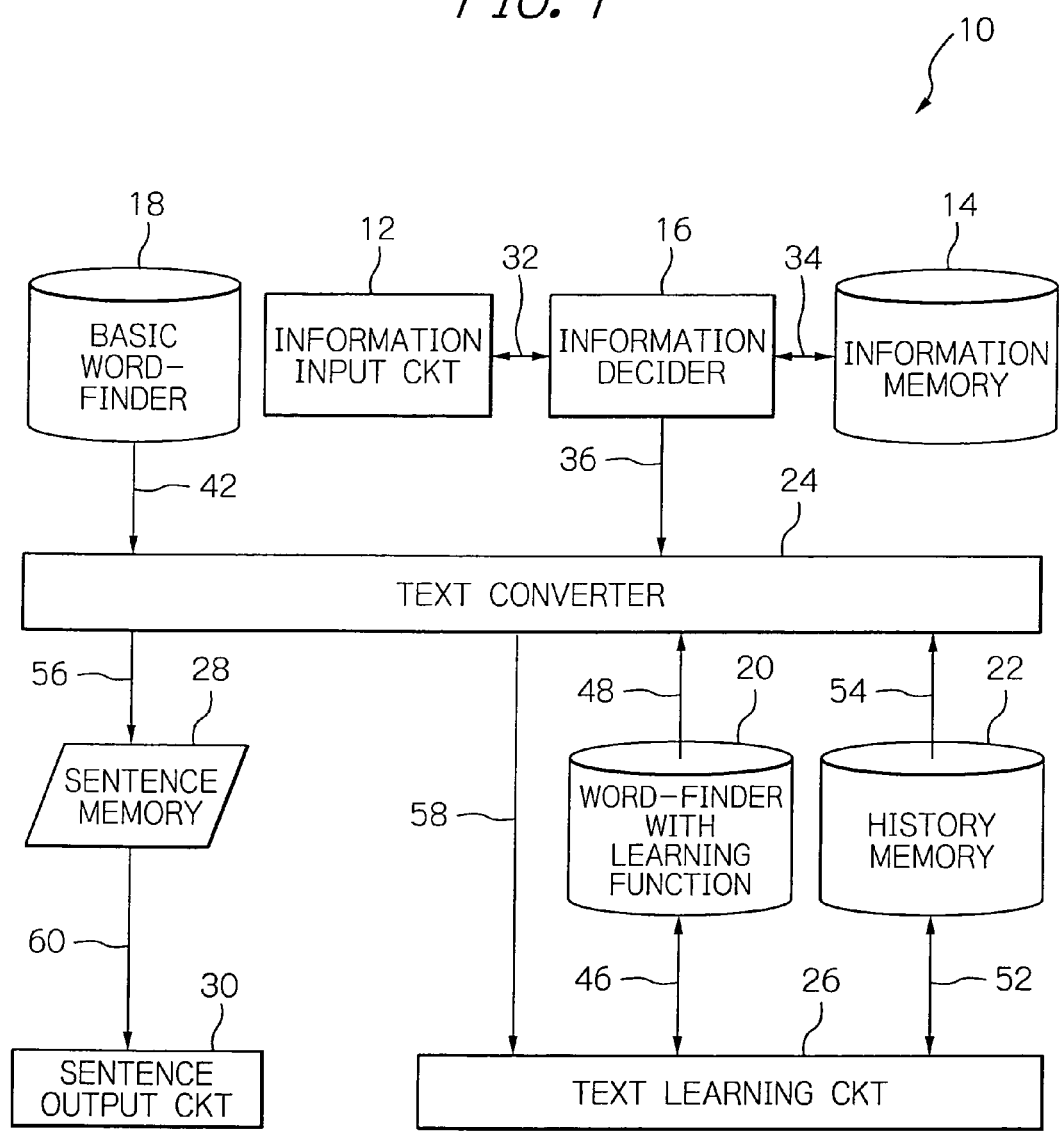
FIG. 1 is a schematic block diagram showing a preferred embodiment of a text input device according to the present invention.

A preferred embodiment of the text conversion apparatus according to the present invention will now be described with reference to the accompanying drawings. With reference to FIG. 1, in a specific embodiment of a text input device 10, a text indicating a destination of transmission is input on an information input circuit 12 as information for the destination of transmission, and input texts such as kana letter strings and output texts such as kanji character strings are stored in a word-finder with learning function 20 in correlation with information on a destination of transmission or the attribute of information on a destination of transmission, while a change in storage caused when correlating an input text matched to the text entered with information on a destination of transmission or an attribute which is stored and coincident with information on the destination of transmission or attribute entered is controlled by a text learning circuit 26 by way of finding a candidate for conversion of the text entered. In the device 10, when producing a converted text; i.e. a character string, matched to an input text, i.e. a letter string, newly entered, at least one output text of character string stored in the text converter 24 is taken out and output. Thus, a character string proper as a candidate for conversion from one destination of transmission to another may be presented to thereby relieve the load in the inputting operation.

The present specific embodiment is directed to the text input device 10 to which the present invention is applied. Parts not directly relevant to understanding the present invention are neither shown nor described. In the patent application, the word "text" is broadly understood in the context as covering the possibility of including letters, characters, figures, numerals and codes.

Still referring to FIG. 1, the text input device 10 includes, in addition to the information input circuit 12, word-finder having learning function 20, text converter 24 and text learning circuit 26, an information memory 14, an information decider 16, a basic word-finder or dictionary 18, a history memory 22, a sentence memory 28 and a sentence output circuit 30, which are interconnected as illustrated. The text input device 10 has the function of inputting a character string used in formulating a sentence to be transmitted to a destination of transmission, such as of an email or an electronic bulletin or message board. Preferably, the text input device 10 includes at least the information input circuit 12, basic word-finder 18, word-finder having learning function 20, text converter 24 and text learning circuit 26.

The information input circuit 12 has the function of entering information on a destination of transmission to which a sentence or message is to be transmitted. As a specified example, the information input circuit 12 includes an output function such as that of a liquid crystal display panel, an input function such as input buttons or keys, and a control function such as that of a control processing circuit. The information input circuit 12 may have a direct entry function of information on a destination of transmission, or a selection function of part or all of information on a destination of transmission which is stored in the information memory 14.

When information on destination of transmission 32, indicating a destination of transmission of a sentence to be transmitted, is entered or selected by the user, the information input circuit 12 sends the information on the destination of transmission 32, entered or selected, to the information decider 16. The information input circuit 12 is supplied with results of decision 32 from the information decider 16. The information input circuit 12 causes the results of decision 32 to be displayed on the liquid crystal panel. Thus, in the following description, signals are denoted with reference numerals for connections on which they are conveyed.

The information memory 14 has the function of storing information on destinations of transmission and information on the attribute of the information on destinations of transmission in conjunction with information on authentication, such as password or biometric information, or with conditions for allowance preset by the user. The information on destinations of transmission represents destinations of transmission, such as email address or URL (Uniform Resource Locator).

Specifically, to the information memory 14, applicable are storage devices such as a RAM (Random Access Memory) or a flash memory. The information on destinations of transmission 32, entered on the information input circuit 12, may be stored from time to time in the information memory 14. The information on destinations of transmission, registered in advance through processing for registration, may also be stored in the information memory 14. In an application to mobile phones having an email function, the information memory 14 contributes to implementing the function of a telephone directory capable of storing email addresses.

The information memory 14 has the information on destinations of transmission 32 written in from the information input circuit 12 via the information decider 16 as information for storage 34. The information memory 14 outputs the information 34 stored therein to the information decider 16.

The information decider 16 has the function of comparing the information on a destination of transmission entered or selected with the information on a destination of transmission stored, and determining the information on the destination of transmission entered or selected to be valid information only in case the information entered or selected satisfies the conditions for allowance. Thus, in entering or selecting information on a destination of transmission, the information decider 16 is supplied with information on authentication in advance via the information decider 16 or other functional constituent elements.

If, in this decision, the information on authentication fails to meet the conditions for allowance, then the information decider 16 is able to make part or all of the stored information on a destination of transmission not apparent to sight to render the information selection impossible. By this function of decision, it is possible for the text input device 10 to prevent the input information from being conjectured by abusive use of the learning or predictive functions.

It is also possible to input information on a destination of transmission together with information on authentication. In that case, the information decider 16 may verify the information on the destination of transmission entered to be valid only when there has been stored a combination of information on a destination of transmission and information on authentication coincident with a combination of the information on the destination of transmission and the information on authentication thus entered.

It should be noted that information on a destination of transmission, entered or selected, is transmitted to a transmission processor, not shown, irrespective of whether or not the information is valid. The information decider 16 may be adapted to transmit only valid information on a destination of transmission 32, or to transmit information on a destination of transmission 32 irrespective of its validity.

The information decider 16 may be adapted to transmit the attributes of information on a destination of transmission, rather than information on a destination of transmission, to the text converter 24. Specifically, as long as the telephone directory function of a mobile phone having a email function is concerned, if the function of grouping together a plurality of destinations of transmission is available, then the information decider 16 may be adapted to transmit an attribute, allocated to information on a destination of transmission, such as grouping information, to the text converter 24. As long as the telephone directory function is concerned, if registration of multiple information on destinations of transmission for a single destination of transmission, such as an individual or an organization, is feasible, then the information decider 16 may transmit an attribute common to the plurality of information on destinations of transmission, registered for the single destination of transmission, to the text converter 24.

The basic word-finder 18 has the function of storing an input text, or letter string, containing at least one letter such as kana letter, and an output text, or character string, containing at least one character such as kanji character and associated with the input text, in correlation with each other. As a storage medium for the basic word-finder 18, a ROM (Read-Only Memory) or an HDD (Hard Disc Drive) may be applied. In the basic word-finder 18, there are stored input and output texts and information correlating the texts as fixed information.

Figure 2:
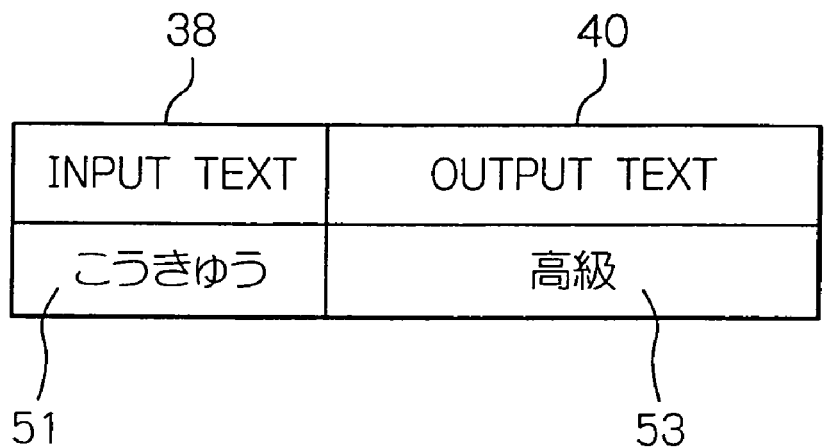
FIG. 2 shows an example of data constitution of a basic word-finder in the text input device shown in FIG. 1.

The basic word-finder 18 has a data format exemplarily shown in FIG. 2. With the data format, shown in FIG. 2, the basic word-finder 18 has stored therein the kana letters 51 pronounced "kokyu" as an input text 38 and the kanji characters or word 53 meaning "high quality" as an output text 40, together with the information on correlation of the input and output texts, as the fixed information. The basic word-finder 18 reads out the information stored therein, and outputs the so read-out information 42 to the text converter 24, FIG. 1.

Like the basic word-finder 18, the word-finder having learning function 20 has the function of storing an input text and an output text matched to the input text in correlation with each other. The word-finder having learning function 20 also functions as a learning storage unit, and may be constituted by a memory circuit, such as a RAM or a flash memory. The word-finder having learning function 20 differs from the basic word-finder 18 in that the input and output texts and information for correlating the input and output texts are stored as non-fixed information. That structure makes it possible with the word-finder having learning function 20 to change such as add, delete or update, the input text 38, output text 40 and information on correlating the input and output texts.

Figure 3:
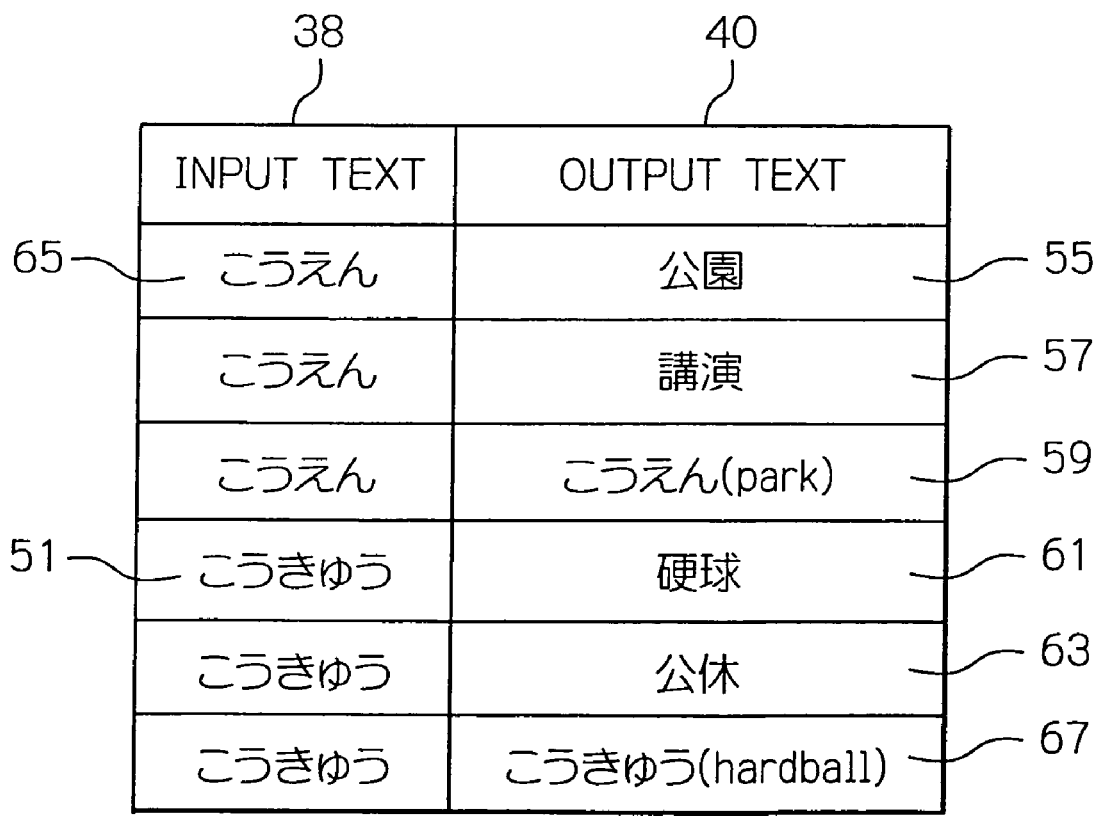
FIG. 3 shows an example of data constitution of a word-finder having the learning function of a conventional text input device.

The word-finder having learning function 20 has the data format, which is used in the conventional system shown in FIG. 3. With the data format, shown in FIG. 3, the word-finder having learning function 20 has stored therein, as the output texts 40, the kanji words pronounced "koen" and meaning "park" 55 and "lecture" 57, which are homonyms, and the kana word 59 pronounced "koen" and meaning "park" together with the English word "(park)" enclosed with parentheses in correlation with one another as the output texts 40 matched to the kana word pronounced "koen" of the input text 38. That is caused by the fact that the Japanese language includes notoriously a plenty of homonyms and kana letters merely define the pronunciation of words. Similarly, the word-finder having learning function 20 has stored therein the kanji words pronounced "kokyu" and meaning "hardball" 61 and "holiday" 63, which are homonyms, and the kana letters or word 69 pronounced "kokyu" and meaning "hardball" together with the English word "(hardball)" enclosed with parentheses in correlation with one another, as the output texts 40 matched to the kana word "kokyu" 51 of the input text 38. Thus, correlated with one input text, at least one output text 40 is stored.

In the present embodiment, together with the kanji word pronounced "koen" and meaning "park" and the kanji word pronounced "kokyu" and meaning "hardball" as the output texts 40, respectively matched to the kana words pronounced "koen" 65 and "kokyu" 51 of the input texts 38, the word-finder having learning function 20 has stored therein an identifier 44 denoted with "U1" as the information 44 on a destination of transmission or the attribute of the information on the destination of transmission, in correlated fashion, as shown in FIG. 4. The word-finder having learning function 20 also has stored therein, together with the kana word pronounced "koen" with the English word "(park)" enclosed with the parentheses and the kana word pronounced "kokyu" with the English word "(hardball)" enclosed with the parentheses of the output text 40 associated respectively with the kana words pronounced "koen" and "kokyu" of the input text 38, as the identifier "U3" for the destination of transmission 44, in a correlated fashion.

Returning again to FIG. 1, the word-finder having learning function 20 outputs data 46 stored therein to the text learning circuit 26 and receives a control signal 46 controlling the change of a data content from the text learning circuit 26. The word-finder having learning function 20 also outputs data 48 stored therein to the text converter 24.

The history memory 22 has stored therein an input text, an output text associated with the input text and information on the conversion history of the output text, similarly to the conventional device. FIG. 5 shows the data format of the history memory 22 used in the conventional system. In the exemplary data format, shown in FIG. 5, the history memory 22 has stored therein the kanji words pronounced "koen" and meaning "park" and "lecture" and the kana word pronounced "koen" and meaning "park" together with the English word "(park)" enclosed with the parentheses, as the output texts 40 matched to the kana word pronounced "koen" of the input text 38, in correlation with the conversion history information 50 representing the frequency of conversion "15", "8" and "1", respectively.

The history memory 22 has stored therein the kanji words pronounced "kokyu" and meaning "hardball", "high quality" and "holiday" and the kana word 67 pronounced "kokyu" together with the English word "(hardball)" enclosed with the parentheses of the output text 40, matched to the kana word pronounced "kokyu" of the input text 38, in correlation with the conversion history information 50 having values "10", "5", "4" and "1", respectively.

Although the frequency of conversion is indicated, as an example of the conversion history information 50, it is possible to use information other than the frequency of conversion as the conversion history information 50.

Conversely, together with an input text, an output text associated with the input text, and conversion history information for the output text, the history memory 22 of the present embodiment has the function of storing the information on the reciprocal correlation. As shown in FIG. 6, the history memory 22 also functions as a learning memory. The history memory 22 has stored therein an input text 38, an output text 40 and conversion history information 50, as conventionally, while having stored therein information for reciprocal correlation 44. As in the word-finder with learning function 20, the input text 38, output text 40 and information for reciprocal correlation 44 are stored as non-fixed information in correlation with the information of a destination of transmission or the attribute thereof, from one destination of transmission to another. It is thus possible for the history memory 22 to perform proper processing for changing, such as addition, deletion or updating, of the input text 38, output text 40, conversion history information 50 and information for reciprocal correlation 44.

Specifically, the history memory 22 has stored therein the identifier "U1" for a destination of transmission 44, along with the kanji words 55, 61 and 67 pronounced "koen" and meaning "park", "hardball" and "high quality", respectively, of the output texts 40 and the frequency of conversion valued as "15", "10" and "3", respectively corresponding to the kana words 65, 51 and 51 pronounced "koen", "kokyu" and "kokyu", respectively, of the input texts 38, shown in FIG. 6, in a correlated fashion. The history memory 22 also has stored therein the identifier "U2" for the destination of transmission 44, along with the kanji words pronounced "koen" and meaning "lecture", "holiday" and "high quality of the output texts 40 and the frequency of conversion valued "8", "4" and "2", respectively corresponding to the kana words pronounced "koen", "kokyu" and "kokyu" of the input texts 38, shown in FIG. 6, in a correlated fashion.

The history memory also has stored therein as the identifier "U3" for the destination of transmission 44, along with the kana word pronounced "koen" with the English word "(park)" enclosed with the parentheses and the kana word pronounced "kokyu" with the English word "(hardball)" enclosed with the parentheses of the output texts 40 and the frequency of conversion 50 valued "1" and "1", respectively corresponding to the kana words pronounced "koen" and "kokyu" of the input texts 38, in a correlated fashion.

Returning now to FIG. 1, the history memory 22 outputs data stored in the text learning circuit 26, while receiving a control signal 52 controlling the change of data content from the text learning circuit 26, as later described. The history memory 22 also outputs data 54 stored in the text converter 24.

The text converter 24 mainly has the function of entering a text, i.e. a string of letters, and converting the text entered to an output text, i.e. a string of characters. The text converter 24 also includes an output circuit such as a liquid crystal display panel, an input circuit such as input buttons or keys, and a control circuit.

In converting the input text, the text converter 24 consults with the basic word-finder 18 to thereby take out an output text, or character string, 40, associated with the input text 38 relevant to the text thus entered. The text converter 24 uses the word-finder having learning function 20 and the history memory 22 to produce an output text associated with the input text. The text converter 24 takes out an output text associated with the input text stored correlated with the information on a destination of transmission or the attribute thereof stored and coincident with the input valid information on the destination of transmission or the attribute thereof entered to output the so taken out output text.

The output text 40, that is, the data 54 output by the history memory 22, are output to the text converter 24 based on the conversion history information 50. In case a plurality of the output texts 40 have been taken out, these output texts 40 are demonstrated on the liquid crystal display panel for the user's review to have him or her select one of the output texts 40, obtained on conversion, by the input button. The text converter 24 outputs the selected output text 56 to the sentence memory 28, while outputting the conversion information 58 on the selected output text to the text learning circuit 26.

In case the input information on the destination of transmission 32 has not been determined to be valid information, it is not possible for the text converter 24 to use the word-finder having learning function 20 and the history memory 22 to thereby take out a output text matched to the input text. Thus, in such a case, only the basic word-finder 18 is consulted with in the course of processing for converting the input text.

The text learning circuit 26 has the function of using the input text, the output text, selected as a converted text in connection with the input text, conversion history information, and information on a destination of transmission or the attribute of the information on the destination of transmission, that is, the transmission destination identifier to thereby change the content of data stored in the word-finder having learning function 20 and the history memory 22. The text learning circuit 26 uses the input text 38, output text 40, conversion history information 50, information on the destination of transmission 44 or transmission destination identifier 44 to change the content of the data stored in the word-finder having learning function 20 and the history memory 22. In order to implement these functions, the text learning circuit 26 includes a control processing circuit, not shown. The text learning circuit 26 outputs control signals 46 and 52 to the word-finder having learning function 20 and the history memory 22, respectively, based on the conversion information 58 supplied.

The sentence memory 28 incidentally stores the output text, selected as a converted text which is matched to the input text. The sentence memory 28 has the function of storing sentences being formulated. The sentence memory 28, implemented by a RAM or a flash memory, stores the output text 56, and provides the sentence output circuit 30 with a sentence 60 read out therefrom.

The sentence output circuit 30 has the function of outputting a sentence supplied thereto, and may include a display output circuit, such as a liquid crystal display panel, and a control processing circuit. The sentence output circuit 30 also outputs to a transmission processor, not shown, the information on the sentence being transmitted. The transmission processor has the function of transmitting sentences or messages.

It should be noted that the text input device 10 may further include program sequences adapted for having its computer system operate as the above-described configuration components. In the text input device 10, the information input circuit 12, information decider 16, text converter 24, text learning circuit 26 and sentence output circuit 30 include a control circuit, not shown. The control circuit may be implemented as circuitry dedicated thereto. Alternatively, the control circuit may include a processor for executing computer program sequences, a memory for storage of data or program sequences of the processor, such as RAM or ROM.

The text input device 10 is not limited to the present specific embodiment. In actuality, it is not mandatory that the respective configuration components of the text input device are definitely separated from or provided independently of one another. For example, the control circuits contained in the information input circuit 12, information decider 16, text converter 24, text learning circuit 26 and sentence output circuit 30 may be configured by a sole processor and a sole memory. The output display circuit in each of the information input circuit 12, text converter 24 and sentence output circuit 30 may be implemented by a sole liquid crystal display panel.

Some of the configuration components of the text input device 10 of the present embodiment may be connected to a telecommunications network and provided outside the text input device 10. Still some of the configuration components, thus arranged outside, may be shared and co-used by the text input devices 10 when provided in plural.

Figure 7:
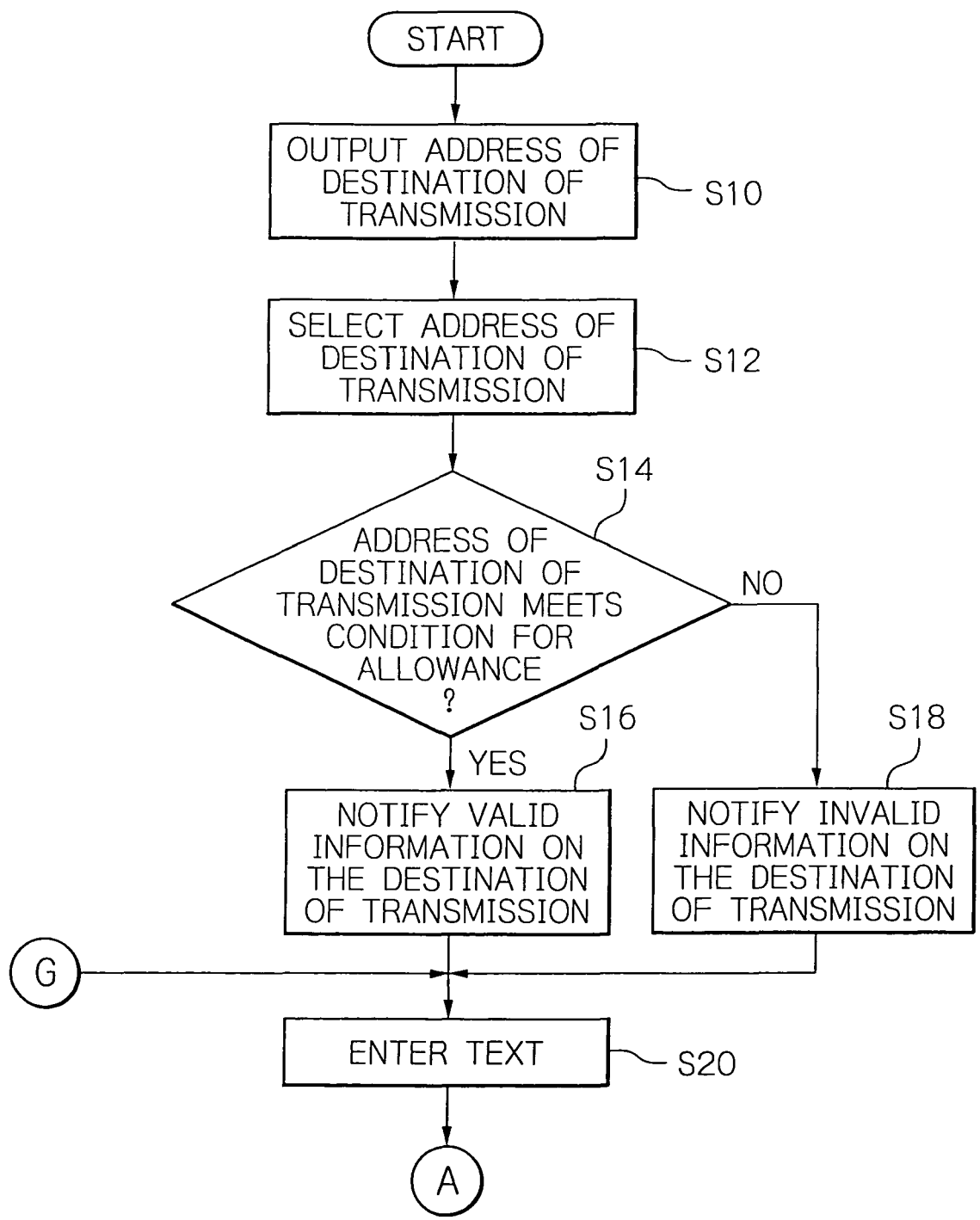
FIGS. 7 through 11 are a flowchart useful for understanding the operational sequence of the text inputting operation shown in FIG. 1.

The sequence of operations in the text input device 10 of the instant illustrative embodiment will now be described with reference to FIGS. 7 to 11. Referring to FIG. 7, the user uses, in an attempt to enter a text, the information input circuit 12 to enter information on a destination of transmission, inclusive of the address of the destination of transmission. In this text inputting operation, the information memory 14 outputs the address of the destination of transmission stored therein (step S10).

The user selects part or all of transmission destination addresses output and displayed in the information input circuit 12 (step S12). When the user directly enters the transmission destination address, subsequent processing is carried out in substantially the same manner.

When this transmission destination address is entered or selected, the information decider 16 verifies whether or not the information on the destination of transmission contained in the so entered transmission destination address satisfies the conditions for allowance (step S14). The information on the destination of transmission is a transmission destination identifier 44, for instance. If the input information on the destination of transmission satisfies the conditions for allowance (YES), the information decider 16 proceeds to processing step S16 for validity notification, that is, notification of the valid information on the destination of transmission or the valid transmission destination identifier. If the information on the destination of transmission entered has failed to satisfy the conditions for allowance (NO), the information decider 16 proceeds to processing step S18 for invalidity notification, that is, notification of the invalid information on the destination of transmission or the invalid transmission destination identifier.

The processing for validity notification notifies the valid information on the destination of transmission or the valid attribute thereof to the text converter 24 (step S16). The processing for invalidity notification notifies the input information on the destination of transmission 44 or the input transmission destination identifier 44 to the text converter 24 (step S18). After the processing for validity notification or the processing for invalidity notification, the text input device proceeds to processing step S20 for entering a text. Subject to this notification of the information on the destination of transmission, the user inputs a text, using the text converter 24 (step S20).

Figure 8:
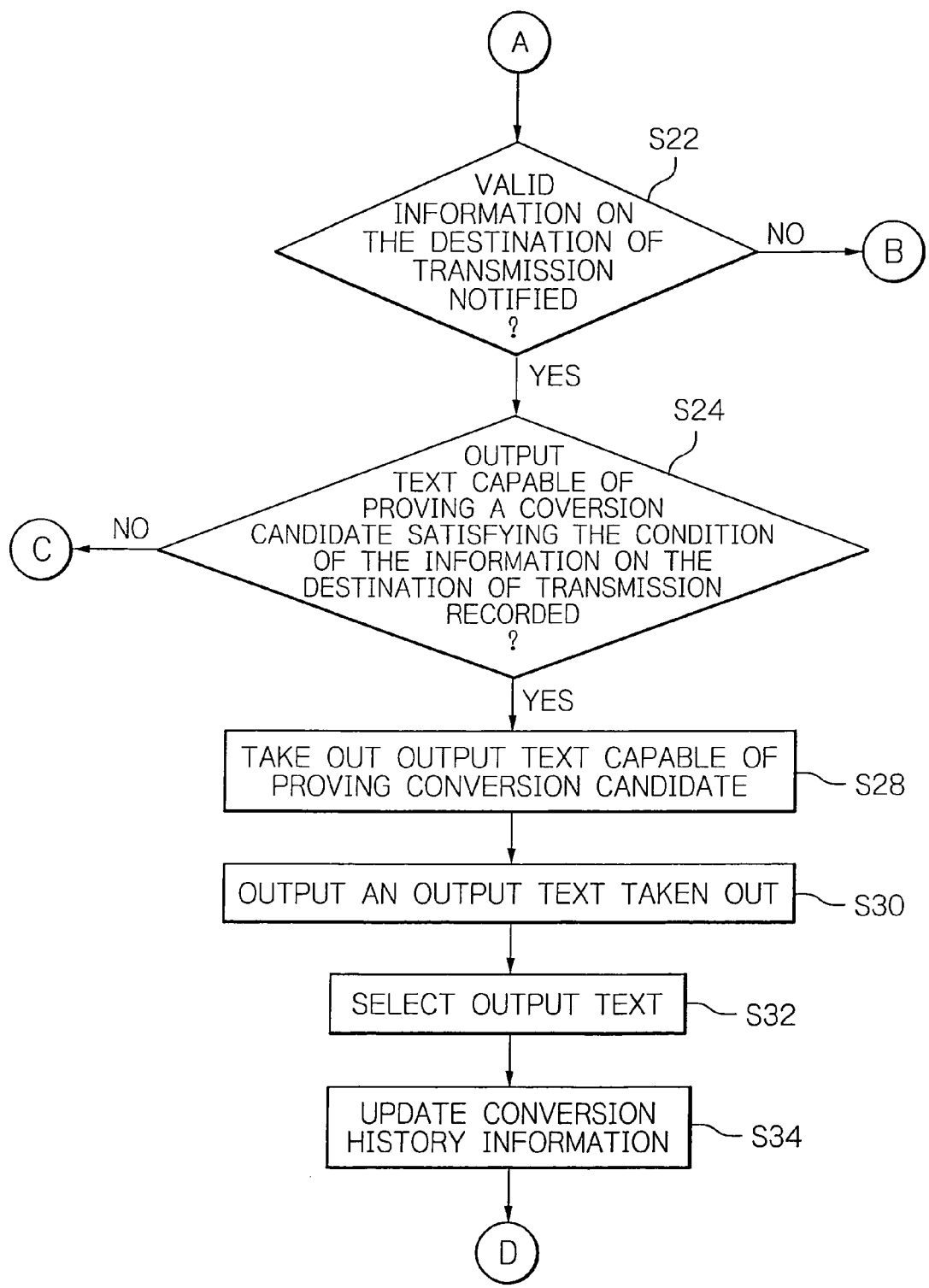
Figure 9:
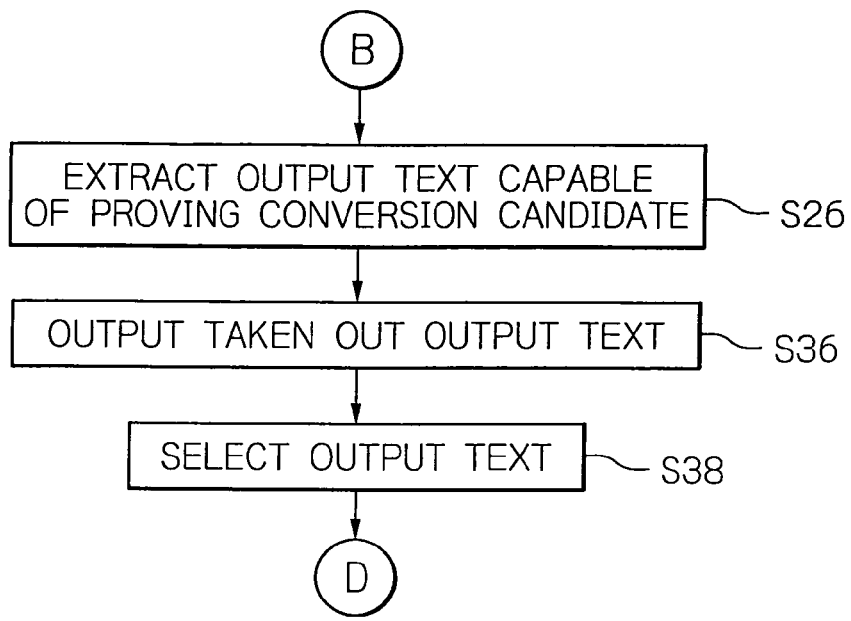
Figure 10:
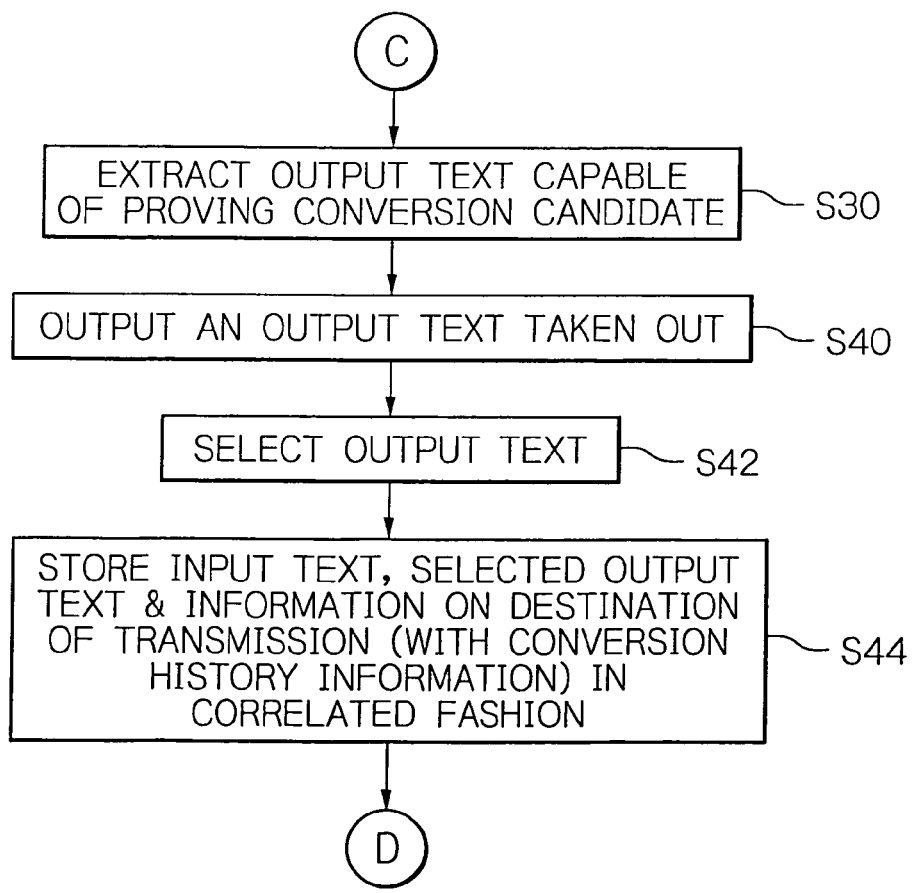

After this inputting, the text input device 10 commences the processing for conversion for the input text via connector A to FIG. 8. For converting the text, the text input device 10 proceeds to processing step S22 for decision shown in FIG. 8.

For the processing for decision, the text converter 24 verifies whether or not the valid information for the destination of transmission has been notified (step S22). If the valid information for the destination of transmission has been notified (YES), the text input device 10 proceeds to processing step S24 for decision as to the presence or absence of the output text as the conversion candidate. If the invalid information for the destination of transmission has been notified (NO), the text input device 10 proceeds to processing step S26 for taking out the output text as the conversion candidate shown in FIG. 9 via a connector B to FIG. 9.

In the processing for decision as to the presence or absence of the output text as the conversion candidate, it is verified whether or not the output text 40, which satisfies the conditions of the information on the destination of transmission 44 or the transmission destination identifier 44 and which may prove the candidate for conversion of the input text, has been stored in the word-finder having learning function 20 or in the history memory 22 (step S24). If it has been determined that the output text 40, which may prove the candidate for conversion, has been stored (YES), the text converter 24 proceeds to processing step S28 for taking out the relevant output text 40 from the word-finder having learning function 20 or the history memory 22. If it has been determined that the output text 40, which may prove the candidate for conversion, has not been stored (NO), the text converter proceeds to processing step S30 for taking out the output text of the candidate for conversion, shown in FIG. 10, via a connection C to FIG. 10.

The take-out processing then takes out the output text 40 by the text converter 24 (step S28) and outputs the so taken out text (step S30). When the so taken out output text 40 is output, the text converter 24 allows the user to select one of the multiple output texts, output as the converted text (step S32)

If none of the output texts has been selected, such as when there is no desired text in the output texts, the processing for conversion for the input text is discontinued, although this is not shown in the processing flowchart shown in FIG. 8. If the processing for conversion is discontinued, the input text itself is selected by the user as being the converted text, or the text for conversion is re-entered.

After selection of the output text (step S32), the conversion history information 50 for the selected output text 40, stored in the history memory 22, is updated (step S34). Specifically, the input text 38, output text 40 and information on the destination of transmission 44 are routed by the text converter 24 to the text learning circuit 26. This allows the text learning circuit 26 to update, by proper processing, the information 50 in the conversion history information on, for example, the frequency of conversion or the date/time of the last conversion. The conversion history information has been stored in the history memory 22 in correlation with the input text 38, output text 40 and information on the destination of transmission 44.

If, in the processing for decision of the content of the notification (step S22), it is found that no valid information on the destination of transmission has been notified (NO), the text converter 24 takes out the output text 40, which may prove a candidate for conversion, from the basic word-finder 18 (step S26). The text converter 24 then outputs the so taken out output text 40 (step S36). When the output text 40 taken out is output, the text converter 24 allows the user to select one of the multiple output texts, output as the converted texts (step S38). The text converter then proceeds to processing shown in FIG. 8 via a connection D to FIG. 11.

If none of the output texts has been selected, the processing or operations similar to those described in connection with the processing for decision of the notification of the valid information on the destination of transmission is carried out.

It is then determined whether or not the output text 40, which may prove to be a candidate for conversion of the input text, has been stored (step S24). If it is determined that the output text 40, which may prove to be the candidate for conversion, has not been stored (NO), the text converter proceeds to take-out processing step S30 shown in FIG. 10. The take-out processing then takes out the output text 40 which may prove to be a candidate for conversion (step S30). The text converter 24 then outputs and displays the so taken out output text 40 (step S40). The text converter 24 then allows the user to select one of the multiple output texts 40, demonstrated as being the converted texts (step S42).

If none of the output texts has been selected, the processing and operations similar to those described above in connection with the processing for decision of the notification of the valid information on the destination of transmission is carried out.

If any one of the output texts is selected as the converted text, the content of data stored in the word-finder having learning function 20 and in the history memory 22 is changed (step S44).

Specifically, the input text 38, output text 40 and information on the destination of transmission 44 are sent by the text converter 24 to the text learning circuit 26. The text learning circuit 26 then causes the new combination of the input text 38, output text 40 and information on the destination of transmission 44 or the transmission destination identifier 44, as attribute thereof, to be stored in the word-finder having learning function 20. The text learning circuit 26 also causes the new combination of the input text 38, output text 40, information on the destination of transmission 44 or the transmission destination identifier and the conversion history information to be stored in the history memory 22. The text learning circuit then proceeds to processing shown in FIG. 8 via the connection D.

Figure 11:
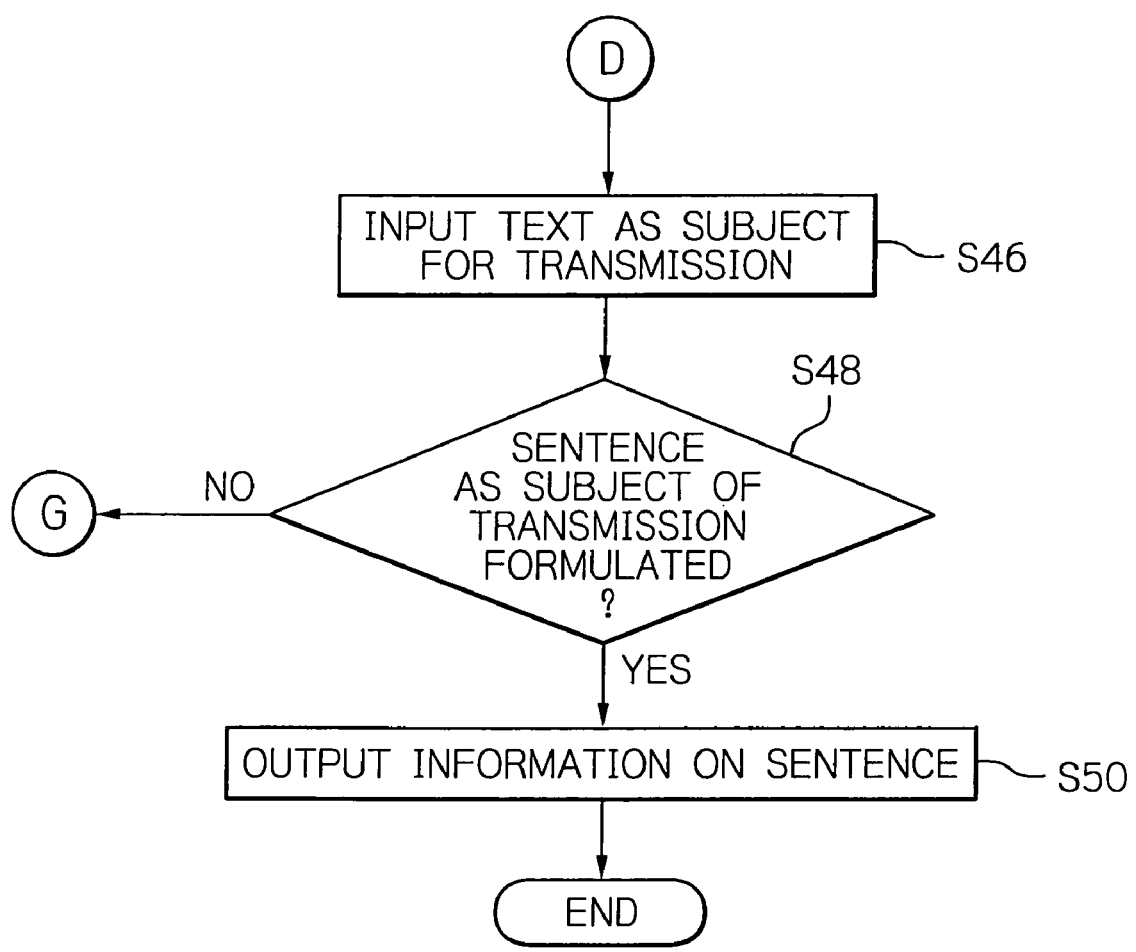

Returning to FIG. 8, the text input device after updating the conversion history information and the connections D and E proceeds to processing step 46 of entering the character shown in FIG. 11 via the connection D. After selecting the converted text, the text, as subject of transmission, is entered (step S46). The text, as subject of transmission, is stored in the sentence memory 28.

It is then checked whether or not formulation of the sentence as the subject of transmission has come to a close (step S48). If the sentence formulation has come to a close (YES), the text input device 10 proceeds to processing step S50 for transmitting the information on the sentence. If sentence formulation has not come to a close (NO), the text input device 10 reverts to the processing step S20 of entering the text shown in FIG. 7 via a connection G to FIG. 7. By this reversion, the text continues to be entered in a repeated manner.

The processing for transmitting the information on the sentence outputs the information on the sentence to a circuit having the function of transmitting the information on the sentence (step S50).

Referring to FIGS. 12 to 15, a specified example of the processing for inputting a text will now be described. When a text is entered in the conventional text input device, the basic word-finder, word-finder having learning function and history memory are of data formats shown in FIGS. 2, 3 and 5, respectively.

In the conventional text input device, a kana letter pronounced "ko" is entered by the user. The text converter refers to data of the basic word-finder and the word-finder having learning function to retrieve the input text having the kana letter pronounced "ko" at its top.

This conventional example is directed to a case where an input text 38, containing an input letter or a string of letters at its top, is treated as an input text relevant to a letter or a letter string entered. It is however possible to treat an input text containing letters entered, or a letter, character, symbol or numerical figure, either alone or in combination, having some relevance to the text entered, as an input text relevant to the text entered.

Figure 12:
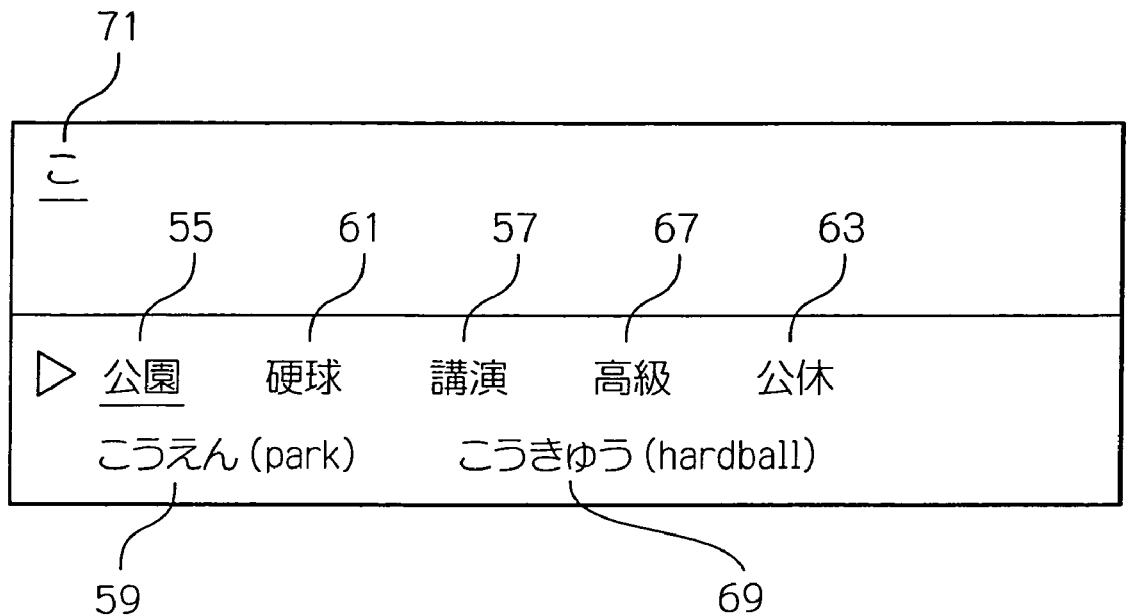
FIGS. 12 and 13 illustrate an example of text input processing in the conventional text input device.

In the basic word-finder, the kana letters pronounced "kokyu" of the input text 38, having the kana letter pronounced "ko" at the top thereof, are stored as they are correlated with the kanji word corresponding to the English word "high quality" of the output text 40. In the word-finder having learning function, the kana letters pronounced "koen" of the input text 38 are stored as they are correlated with the kanji words meaning "park" and "lecture" and the kana word pronounced "koen" with the English word "(park)" enclosed with the parentheses, of the output text 40 while the kana letters pronounced "kokyu" of the input text 38 are stored as they are correlated with the kanji words meaning "hardball" and "holiday" and the kana word pronounced "kokyu" with the English word "(hardball)" enclosed with the parentheses, of the output text 40. The results of retrieval are shown in FIG. 12.

Since the multiple output texts 40 that may prove to be candidates for conversion are stored in correlation with the kana letter 71 pronounced "ko", the text converter refers to data of the history memory to retrieve an input text having the kana letter 71 pronounced "ko" at the top thereof.

The history memory has stored therein output texts 40, the kanji words meaning "park", "hardball", "lecture", "high quality" and "holiday", and the kana letter pronounced "koen" with the English word "(park)" enclosed with the parentheses and the kana letter pronounced "kokyu" with the English word "(hardball)" enclosed with the parentheses, correlated with one of the kana letters pronounced "koen" and "kokyu" of the input texts 38, each having the letter 71 pronounced "ko" at the top thereof, as the output texts are further correlated with the conversion frequency of values "15", "10", "8", "5", "4", "1" and "1". The text converter thus outputs these output texts 40, which may prove to be candidates for conversion in association with the kana letter pronounced "ko" to, for example, an output circuit of a text converter, based on the frequency of conversion, as shown in FIG. 12.

Figure 13:
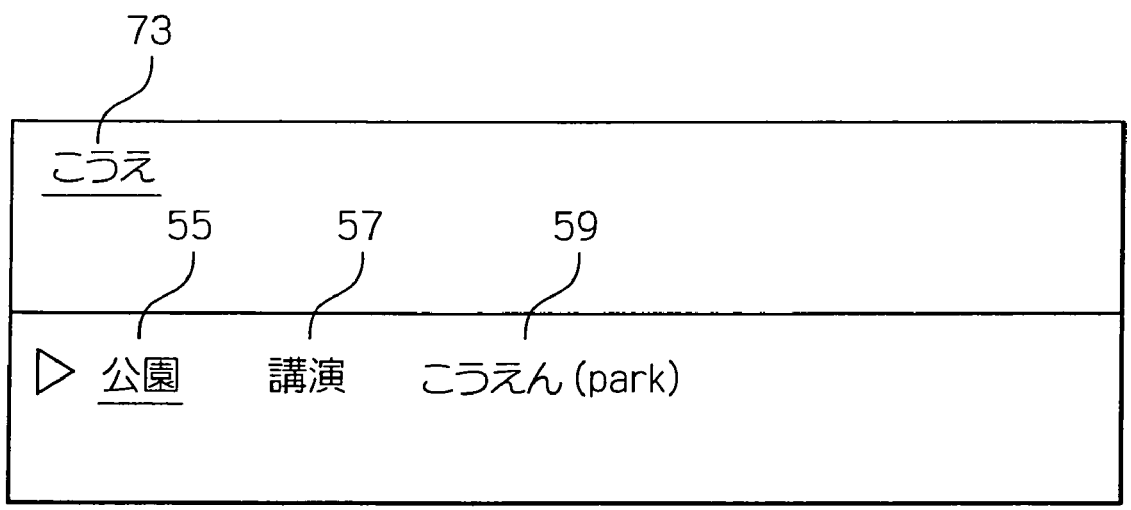

When next the user enters a text including the kana letters 73 pronounced "koe", the text converter refers to data of the word-finder having learning function and the history memory to retrieve the input texts 38 each having the kana letters 73 pronounced "koe" at the top thereof. The retrieved results are shown in FIG. 13.

In the basic word-finder, the input text 38 having the text, or the kana letters, pronounced "koe" at its top is not stored. In the word-finder having learning function, the kana letters pronounced "ko" of the input text 38 are stored as they are correlated with the kanji characters meaning "park" and "lecture" and the kana letters pronounced "koen" with the English word "(park)" enclosed with the parentheses.

It is noted that the word-finder having learning function has stored therein a plurality of output texts 40 that may prove to be candidates for conversion in association with the kana letters pronounced "koe". Hence, the text converter refers to data of the history memory to retrieve the input text having the kana letters pronounced "koe" at its top.

The history memory has stored therein the kanji characters meaning "park" and "lecture" and the kana letters pronounced "koen" with the English word "(park)" enclosed with the parentheses of the output texts 40, matched to the kana letters pronounced "koen" of the input texts 38, having the kana letters pronounced "koe" at the top thereof, in a state in which the output texts are correlated with the conversion frequency of values "15", "8" and "1". The text converter thus outputs these output texts 40 to its output circuit based on the conversion frequency as shown in FIG. 13.

Thus, the conventional text input device does not refer to information on a destination of transmission, in taking out texts that may prove to be candidates for conversion, and hence is unable to optimize the processing for conversion independence upon a destination of transmission to release the load in the inputting operation.

Moreover, the texts, which may prove to be the candidates for conversion for a letter or letter entered, are taken out at random from the word-finder and displayed. Hence, it may occur that the learning function is abused to surmise information entered from the letter or letters that may prove to be the candidates for conversion.

In contrast, in the text input device 10 of the present illustrative embodiment, the basic word-finder 18, word-finder having learning function 20 and history memory 22 are of data formats shown in FIGS. 2, 4 and 6, respectively. Such a case will now be described in which, as a destination of transmission of a sentence to be transmitted, valid information on the destination of transmission, including the transmission destination identifier "U2", has been entered or selected.

Figure 14:
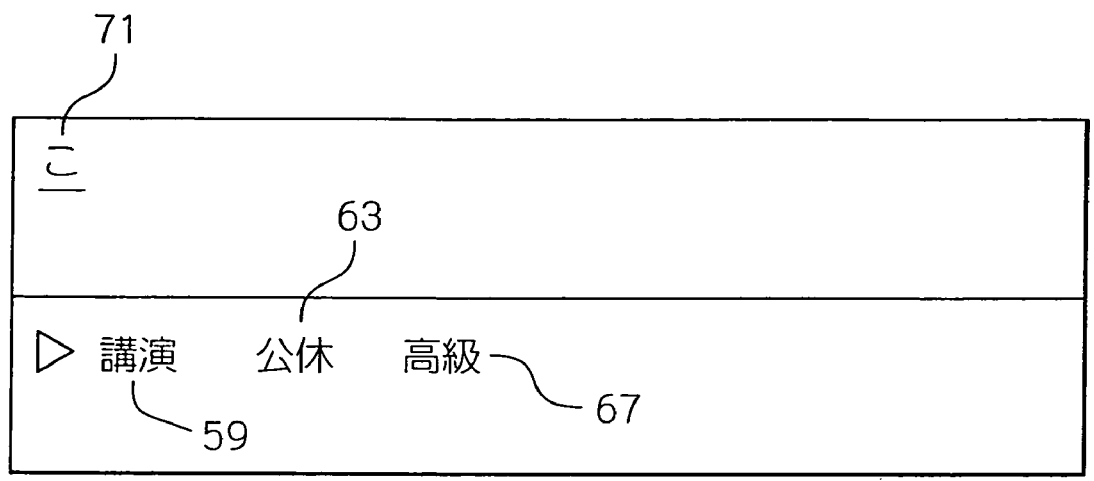
FIGS. 14 and 15 illustrate an example of text input processing in the text input device shown in FIG. 1.

In the present embodiment, the kana letter pronounced "ko" is entered by the user, as shown in FIG. 14. The text converter 24 refers to data of the basic word-finder 18 and the word-finder having learning function 20 to retrieve the input texts 38 each containing the input kana letter pronounced "ko" at the top thereof.

The illustrative embodiment is directed to an exemplary case of handling the input text 38 containing a letter or letters entered at its top as being the input text relevant to the letter or letters entered. However, the text input device 10 may also handle an input text, containing a string of letters entered, or letters, characters, symbols, numerical figures or combinations thereof, having some pertinence to the text entered, as being the input text relevant to the letter or letters entered.

In the basic word-finder 18, the kana letters pronounced "kokyu" of the input text 38, containing the kana letter pronounced "ko" at the top thereof, are stored in correlation with the kanji characters meaning "high quality" of the output text 40. In the word-finder having learning function 20, the kana letters pronounced "koen" and "kokyu" of the input texts 38 are stored correlated with the kanji words meaning "lecture" and "holiday" of the output texts 40 in a state of being further correlated with the transmission destination identifier 44 "U2".

Since the word-finder having learning function 20 has stored therein a plurality of output texts 40 that may prove to be candidates for conversion in association with the kana letter pronounced "ko", the text converter 24 refers to data of the history memory 22 to retrieve the input text containing the kana letter pronounced "ko" at its top.

In the history memory 22, there are stored the kana letters pronounced "koen" and "park" of the input texts 38, each containing the kana letter pronounced "ko" at the top thereof, the kanji words meaning "lecture", "holiday" and "high quality" of the output texts 40, correlated with one of the input texts 38, and the conversion frequency 50 of values "8", "4" and "2", correlated with the output texts, in a state in which the texts are further correlated with the transmission destination identifier 44 "U2". The text converter 24 thus outputs these output texts 40, which may prove to be candidates for conversion in connection with the kana letter pronounced "ko", to the output circuit of the text converter 24, based on the conversion frequency 50, as shown in FIG. 14.

When next the kana letters pronounced "koe" are entered by the user, the text converter 24 refers to data of the basic word-finder 18 and the word-finder having learning function 20 to retrieve the input texts 38 each containing the input kana letters pronounced "koe" at the top thereof.

In the basic word-finder 18, no input text containing the input kana letters pronounced "koe" at its top is stored. In the word-finder having learning function 20, the kana letter pronounced "koen" of the input text 38 and the kanji characters meaning "lecture" of the correlated output text 40 are stored correlated with the transmission destination identifier 44 "U2".

Figure 15:
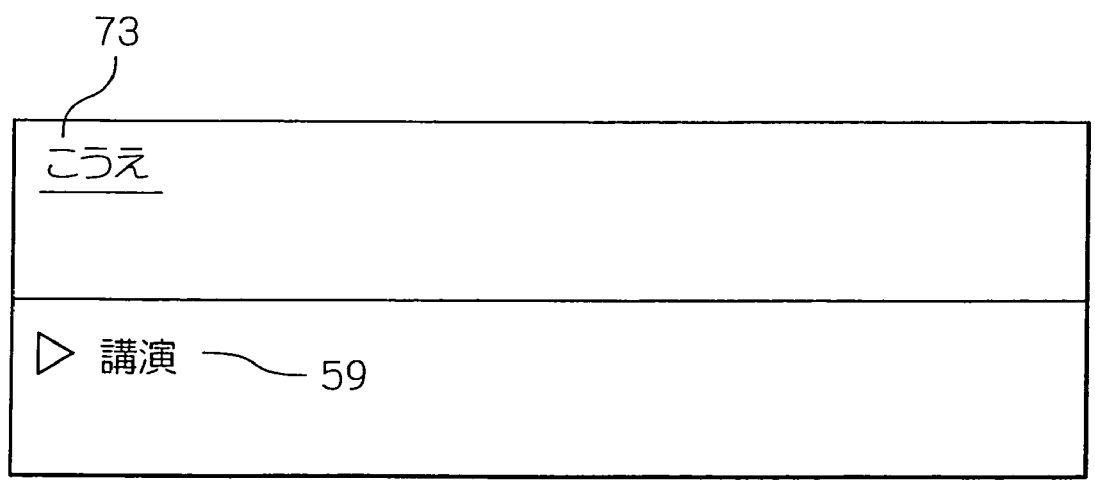

Since only one output text, which may prove to be a candidate for conversion for the kana letters pronounced "koe", is stored, the text converter 24 outputs the kanji characters meaning "lecture", which may prove to be a candidate for conversion in association with the kana letters pronounced "koe", to its output circuit, as shown in FIG. 15.

Such a case will now be described where the invalid information on the destination of transmission, containing the transmission destination identifier 44 "U2", has been entered or selected as being the destination of transmission of a sentence as a subject of transmission. The present embodiment is directed to a case where the kana letter pronounced "ko", for example, has been entered by the user.

In the basic word-finder 18, the kana letters pronounced "kokyu" of the input text 38, containing the kana letter pronounced "ko" at the top thereof, are stored correlated with the kanji characters meaning "high quality" of the output text 40. However, since the transmission destination identifier 44 "U2" is not verified to be valid information on the destination of transmission, the text converter 24 is unable to take out the output texts 40, which may prove to be candidates for conversion of the input text, using the word-finder having learning function 20 and the history memory 22. Hence, the text converter 24 outputs only the kanji characters meaning "high quality" of the output text 40, which may prove to be a candidate for conversion in association with the kana letter pronounced "ko", to its output circuit.

In operation, the text input device 10 receives a text and the information on the destination of transmission of the text, and converts the input text to a matched text. The text input device 10 then causes the input text and the text, obtained on conversion, to be stored as the input text and the output text, respectively, in the state of being correlated with the information on the destination of transmission, or the attribute thereof. When a new text is entered, the text input device takes out, as a candidate for the text entered, at least one output text 40 stored correlated with the input text 38, matched to the text entered, and with the information on the destination of transmission or the attribute thereof stored, coincident with the information on the destination of transmission or the attribute thereof entered. The text input device 10 outputs the so taken out output text 40, and receives the output text 40 as being a converted text matched to the newly entered text. Thus, a proper text, which may prove to be a candidate for conversion, is presented in the text input device 10, in dependence upon the destination of transmission entered as the information on the destination of transmission, thereby relieving the load on the inputting operation.

For example, in the exploitation of an email or an electronic bulletin board, there are cases where the style of the sentence, as the subject for transmission, is to be changed depending on the destination of transmission, between the style for public use and that for private use. In particular, the style of the Japanese sentence may readily be changed by the sentence-end expression. Thus, if a proper text, which may prove to be, a candidate for conversion, is presented, in dependence upon the destination of transmission, on inputting a text composed of several characters contained at the top of the input text, as the subject of transmission, the result is a relieved load on the inputting operation.

It should be noted that the text input device 10 and the principle in the method for entering information thereto, according to the present embodiment, are not limited to specific processing for sentence inputting with the Japanese language, but may also be applied to processing for sentence inputting with any other languages such as Chinese.

Moreover, with the text input device 10 and the method for entering information thereto, the information on the destination of transmission is stored along with the conditions for allowance. The information on the destination of transmission entered is verified to be valid only in case the conditions for allowance are met. In this case, the texts entered and converted are stored correlated with valid information on a destination of transmission or the attribute thereof, as being the input text and the output text, respectively. The text input device takes out, as a candidate for conversion of the text entered, at least one output text stored correlated with an input text matched to the text entered, and with the information on a destination of transmission or the attribute thereof stored, coincident with the information on the destination of transmission or the attribute thereof entered. The text input device 10 may thus output the output text 40 stored correlated with the information on the destination of transmission or the attribute thereof only in case the conditions for allowance are met. It is thus possible to prevent the past input information from being conjectured by abusive use of the learning function from the texts which may prove to be the candidates for conversion.

The above embodiment is directed to such a case where only the output text which satisfies the conditions for the attributes of the information on the destination of transmission or the attribute thereof is presented. The text input device 10 and the method for inputting text thereto may similarly be applied to a case where the output text not satisfying the conditions concerning the information on the destination of transmission or the attribute thereof is to be presented along with the output text satisfying the above condition, provided that there is no risk of abusive use of the learning function. In such a case, if an output text satisfying the above conditions is preferentially presented, then it becomes possible to select a proper text from a wide gamut of alternatives.

The entire disclosure of Japanese patent application No. 2007-157428 filed on Jun. 14, 2007, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A text conversion apparatus wherein a text is entered which includes at least one letter associated with a character to be transmitted, and one candidate matching the text entered is selected among a plurality of candidates of output texts to which the text entered is to be at least partially converted, the one candidate being output from an output circuit as an output text including the character to be transmitted, said apparatus comprising:
   an information input circuit for entering a letter indicating a destination of transmission as information on the destination of transmission;
   a text converter for converting the text entered to an output text matched to the text entered;
   a word-finder with learning function for storing an input text and the output text in association with either of the information on the destination of transmission and an attribute of the information on the destination of transmission; and
   a text learning circuit for controlling a change in storage caused by correlating the input text relevant to the text entered with either of the information on the destination of transmission and the attribute of the information on the destination of transmission stored and coincident with either of the information on the destination of transmission and the attribute of the information on the destination of transmission entered to thereby generate a candidate of conversion of the text entered;
   said text converter taking out an output text which is matched to the input text stored in correlation with either of the information on the destination of transmission and the attribute of the information on the destination of transmission stored and coincident with either of the information on the destination of transmission and the attribute of the information on the destination of transmission entered.

2. The apparatus in accordance with claim 1, further comprising:
   an information memory for storing the information on the destination of transmission along with a predetermined condition for allowance; and
   an information decider for determining the input information on the destination of transmission as valid information only subject to the condition for allowance being satisfied;
   said word-finder with learning function storing the input text and the output text only in correlation with either of the valid information on the destination of transmission and the attribute of the valid information on the destination of transmission;
   said text converter taking out, as a candidate for conversion of the text entered, only at least one output text stored correlated with the input text relevant to the text entered and with either of the valid information on the destination of transmission and the attribute of the information on the destination of transmission stored and coincident with either of the input valid information on the destination of transmission and the attribute of the information on the destination of transmission entered.

3. The apparatus in accordance with claim 1, wherein said word-finder with learning function stores the input text relevant to the text entered, and the output text selected as a converted text as matched to the text entered, in correlation with conversion history information and with either of the information on the destination of transmission and the attribute of the information on the destination of transmission,
   said output circuit outputting at least one output text taken out, based on the conversion history information.

4. The apparatus in accordance with claim 1, further comprising
   a history memory for storing the input text relevant to the text entered and the output text selected as the converted text and matched to the text entered, in correlation with the conversion history information and with either of the information on the destination of transmission and the attribute of the information on the destination of transmission,
   said output circuit outputting at least one output text taken out, based on the conversion history information.

5. A method for text conversion wherein a text is entered which includes at least one letter associated with a character to be transmitted, and one candidate matching the text entered is selected among a plurality of candidates of output texts to which the text entered is to be at least partially converted, the one candidate being output as an output text including the character to be transmitted, said method comprising:
   a first step of inputting a letter indicating a destination of transmission as information on the destination of transmission;
   a second step of storing an input text and the output text in association with either of the information on the destination of transmission and an attribute of the information on the destination of transmission;
   a third step of taking out, as a candidate for conversion for the text entered, at least one output text stored correlated with the input text relevant to the text entered and with either of the information on the destination of transmission and the attribute of the information on the destination of transmission stored and coincident with either of the information on the destination of transmission and the attribute of the information on the destination of transmission entered; and
   a fourth step of outputting at least one output text taken out in outputting a converted text matched to the text entered.

6. The method in accordance with claim 5, said method further comprising:
   a fifth step of storing the information on the destination of transmission along with a predetermined condition for allowance; and
   a sixth step of verifying the information on the destination of transmission entered as valid information on the destination of transmission only in case the predetermined condition for allowance is met, said second step storing the text entered and a text converted to match to the text entered, as the input text and the output text, respectively, in correlation with only either of the valid information on the destination of transmission and the valid attribute of the information on the destination of transmission;

said third step taking out, as a candidate for conversion of the text entered, only at least one output text stored correlated with the input text relevant to the text entered and with either of the valid information on the destination of transmission and the valid attribute of the information on the destination of transmission stored and coincident with either of the valid information on the destination of transmission and the valid attribute of the information on the destination of transmission entered.

7. The method in accordance with claim 5, wherein said fourth step outputs at least one output text taken out, based on conversion history information on conversion history.

8. A non-transitory computer-readable medium on which is stored a program for having a computer operate as a text conversion apparatus wherein a text is entered which includes at least one letter associated with a character to be transmitted, and one candidate matching the text entered is selected among a plurality of candidates of output texts to which the text entered is to be at least partially converted, the one candidate being output from an output circuit as an output text including the character to be transmitted, said text conversion apparatus comprising:

an information input circuit for entering a letter indicating a destination of transmission as information on the destination of transmission;

a text converter for converting the text entered to an output text matched to the text entered;

a word-finder with learning function for storing an input text and the output text in association with either of the information on the destination of transmission and an attribute of the information on the destination of transmission; and a text learning circuit for controlling a change in storage caused by correlating the input text relevant to the text entered with either of the information on the destination of transmission and the attribute of the information on the destination of transmission stored and coincident with either of the information on the destination of transmission and the attribute of the information on the destination of transmission entered to thereby generate a candidate of conversion of the text entered;

said text converter taking out an output text which is matched to the input text stored in correlation with either of the information on the destination of transmission and the attribute of the information on the destination of transmission stored and coincident with either of the information on the destination of transmission and the attribute of the information on the destination of transmission entered.

\* \* \* \* \*

UNITED STATES PATENT AND TRADEMARK OFFICE
CERTIFICATE OF CORRECTION

| | | |
|---|---|---|
| PATENT NO. | : 8,107,731 B2 | |
| APPLICATION NO. | : 12/155731 | |
| DATED | : January 31, 2012 | |
| INVENTOR(S) | : Okumura | |

It is certified that error appears in the above-identified patent and that said Letters Patent is hereby corrected as shown below:

Title Page, Item 75 (Inventor)

"Tokyo" should be changed to --Osaka--

Signed and Sealed this
Third Day of April, 2012

David J. Kappos
*Director of the United States Patent and Trademark Office*